(No Model.)
C. D. COURTRIGHT & C. A. POWELL.
DEVICE FOR CUTTING CORN.
No. 513,380.　　　　　　　　　Patented Jan. 23, 1894.
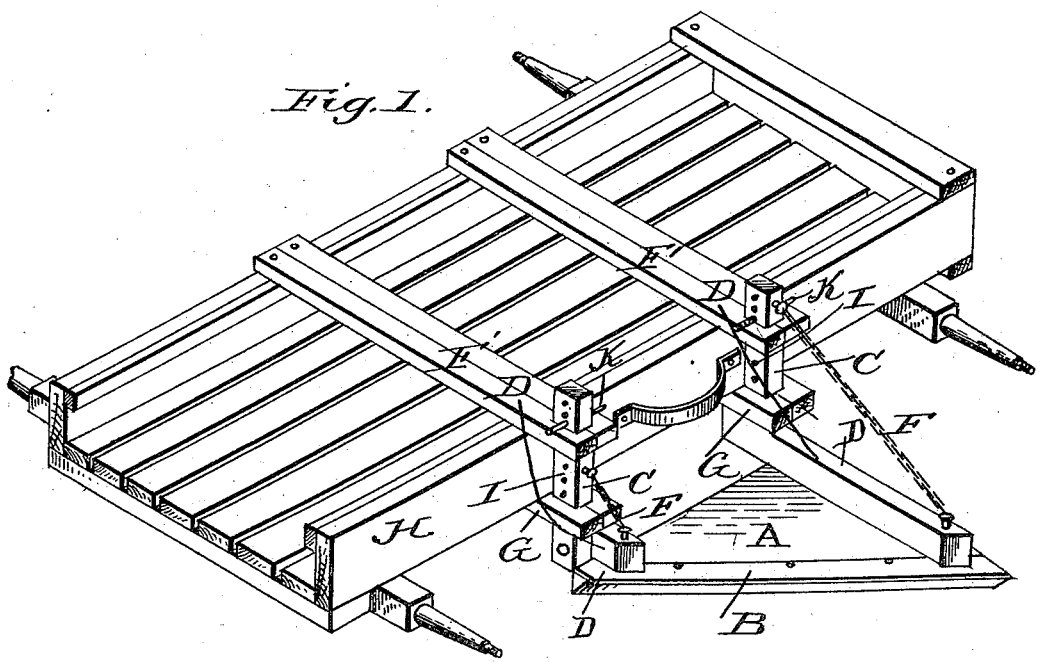
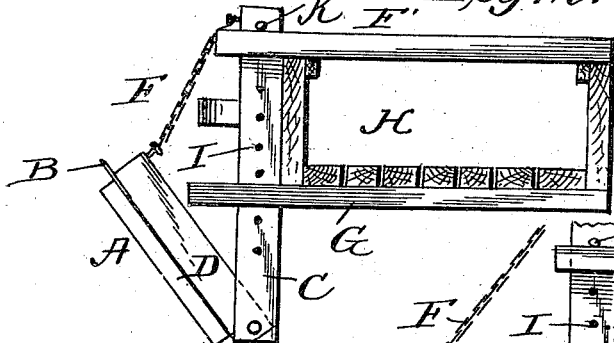
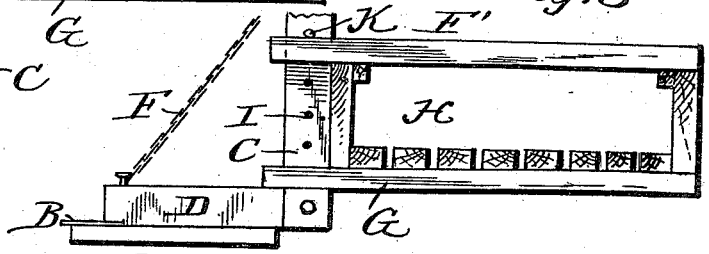

UNITED STATES PATENT OFFICE.

CHARLES D. COURTRIGHT AND CLARENCE A. POWELL, OF KENESAW, NEBRASKA.

DEVICE FOR CUTTING CORN.

SPECIFICATION forming part of Letters Patent No. 513,380, dated January 23, 1894.

Application filed February 27, 1893. Serial No. 463,872. (No model.)

*To all whom it may concern:*

Be it known that we, CHARLES D. COURT-RIGHT and CLARENCE A. POWELL, of Kenesaw, in the county of Adams and State of Nebraska, have invented certain new and useful Improvements in Devices for Cutting Corn; and we do hereby declare that the following is a full, clear, and exact description of the invention, such as will enable others skilled in the art to which it appertains to make and use the same, reference being had to the accompanying drawings, and to letters of reference marked thereon, which form a part of this specification.

The herein described invention relates to a new and useful improvement in devices for cutting corn stalks and is especially designed with a view of providing a simple attachment to be used on a farm wagon, by which small farms are provided with a complete harvester without the expense of costly implements.

The invention consists in certain novel features and the arrangement and construction of parts, all as hereinafter set forth.

In the accompanying drawings in which the invention is fully illustrated: Figure 1, is a perspective view of the complete device and in its lowered position. Fig. 2, is a view showing the cutting platform folded up, and, Fig. 3, is a transverse sectional view through the wagon body showing the device adjusted to a higher elevation than is shown in Fig. 2.

The platform A, which forms the main feature of the invention, is made in preferably right angle-triangular form having preferably a much greater length than width, and is so located with reference to the wagon body, as to bring its longest edge on the outer side, thus forming a gradual incline outward from the front toward the rear. On this outer incline side of the triangular platform is provided along its entire length, a knife or cutting edge B which projects slightly therefrom. The inner edge of the platform runs parallel to the body of the wagon and is connected to the uprights C, forming the supports for the platform, by hinge or pivot connection. The construction shown for bringing about this connection and at the same time giving additional strength to the platform, consists in securing to the platform, on its upper face at each end, the bars D, which project over the inner side of the platform and are each pivotally secured to the side of its respective upright at its lower end. Support is given the outer side of the platform by means of the chains F, which are fastened at one end to the platform at its outer edge and to the top of the upright at its other end, and by means of the flexible connection of the platform to the uprights and the flexible support referred to, the platform is adapted to be folded up when not in use or traveling over roads, or when it is desired to clear obstacles in the field.

The uprights C, are adjustably mounted on the wagon body, being held in their vertical position by the cross timbers F' and G, which are firmly secured to the bed frame H, of the wagon body, both above and underneath the same. These cross timbers F' and G extend over the side of the wagon sufficiently to allow the uprights to extend up through the openings made therein for their reception.

In order to hold the uprights at any elevation from the ground and thereby adjust the platform as may be desired or as the nature of the field may require, a series of holes I, are made in the uprights into which are inserted the pins K, which engaging the upper cross pieces or timbers, prevent the platform from being lowered farther while thus adjusted to an elevation.

To the side of the bed frame H, is secured a suitable metal band in the form of a semicircle which projects out over the cutting platform and forms the means of supporting the attendant standing on the platform, the band being of a size to encircle the body and prevent him from slipping off the platform while allowing the free use of his hands in manipulating the stalks in cutting.

The operation of the device can be seen from the following: In the device as described and shown a large cutting edge is presented to the field of stalks having a gradual incline and the attendant on the platform can readily gather in the stalks as they engage the cutting edge of the platform, and hold them in their upright position, or inclined toward him, until severed, while the wagon on which the device is mounted can be filled with the stalks as they are cut, the stalks being passed to a man in the wagon by the attendant on the platform without a second handling.

Having thus described our invention, what we claim, and desire to secure by Letters Patent, is—

1. In a corn harvester the combination with the wagon body, of upper and lower supporting beams F' and G, upright C adjustably supported by said beams, a triangular platform A having a knife arranged to project over its outer inclined edge, said platform being hinged to the lower ends of the uprights and connected with the said uprights at their upper ends by an adjustable supporting connection, substantially as and for the purpose set forth.

2. In a corn cutting device of the character described the combination of the triangular cutting platform having the cutting edge on its inclined side, the adjustable uprights extending downward from the wagon body, to which said platform is hinged, and the main supporting band attached to the wagon body, and extending out over the platform, substantially as described.

In testimony that we claim the foregoing as our own we hereby affix our signatures in presence of two witnesses.

CHARLES D. COURTRIGHT.
CLARENCE A. POWELL.

Witnesses:
EUGENE B. MOORE,
L. G. NORTON.